US006070814A

United States Patent [19]

Deitesfeld

[11] Patent Number: 6,070,814

[45] Date of Patent: Jun. 6, 2000

[54] METHOD AND APPARATUS FOR APPLYING AGRICULTURAL SEED OR FERTILIZER MIX OVER THE SURFACE OF THE GROUND

[76] Inventor: Rex R. Deitesfeld, 2174 Meadow Vale Rd., Longmong, Colo. 80504

[21] Appl. No.: 08/954,669

[22] Filed: Oct. 20, 1997

Related U.S. Application Data

[63] Continuation-in-part of application No. 08/547,955, Oct. 25, 1995, abandoned.

[51] Int. Cl.[7] .............................. B05B 7/00; A01C 15/04

[52] U.S. Cl. .............................................................. 239/654

[58] Field of Search ............................................... 239/654

[56] References Cited

U.S. PATENT DOCUMENTS

| | | | |
|---|---|---|---|
| 2,740,230 | 4/1956 | Clapper . | |
| 2,818,682 | 1/1958 | Finn | 47/58 |
| 2,892,286 | 6/1959 | Martin . | |
| 3,174,251 | 3/1965 | West . | |
| 3,310,237 | 3/1967 | Welch . | |
| 3,330,445 | 7/1967 | Love, Jr. . | |
| 3,473,306 | 10/1969 | Ewasko . | |
| 3,658,258 | 4/1972 | Carlyon, Jr. . | |
| 3,717,285 | 2/1973 | Hatton . | |
| 3,760,933 | 9/1973 | Maldeis et al. . | |
| 3,812,615 | 5/1974 | Jamison . | |
| 3,861,599 | 1/1975 | Waggoner | 239/654 |
| 4,089,441 | 5/1978 | Cole et al. . | |
| 4,184,416 | 1/1980 | Koontz . | |
| 4,186,885 | 2/1980 | Christian . | |
| 4,219,050 | 8/1980 | Hargrave et al. . | |
| 4,266,370 | 5/1981 | Kodera et al. . | |
| 4,280,419 | 7/1981 | Fischer . | |
| 4,296,695 | 10/1981 | Quanbeck . | |
| 4,302,344 | 11/1981 | Ruff et al. . | |
| 4,318,844 | 3/1982 | Kohler et al. . | |
| 4,339,890 | 7/1982 | Koeing et al. . | |
| 4,352,463 | 10/1982 | Baker . | |
| 4,385,477 | 5/1983 | Walls et al. . | |
| 4,483,486 | 11/1984 | Magda . | |
| 4,511,284 | 4/1985 | Sterner . | |
| 4,560,307 | 12/1985 | Deitesfeld | 406/63 |
| 4,630,929 | 12/1986 | Medlin | 239/654 X |
| 4,688,729 | 8/1987 | Hobson, Sr. . | |
| 4,709,860 | 12/1987 | Patrick et al. . | |
| 4,723,710 | 2/1988 | Lucore, II . | |
| 4,798,325 | 1/1989 | Block . | |
| 4,829,738 | 5/1989 | Moss . | |
| 4,955,538 | 9/1990 | Laube et al. . | |
| 5,190,225 | 3/1993 | Williams . | |
| 5,213,271 | 5/1993 | Uribe et al. . | |
| 5,301,460 | 4/1994 | Corbitt . | |
| 5,333,795 | 8/1994 | Jessen . | |
| 5,361,711 | 11/1994 | Beyerl . | |
| 5,365,716 | 11/1994 | Munson . | |
| 5,367,849 | 11/1994 | Bullock . | |
| 5,379,568 | 1/1995 | Murray . | |
| 5,433,519 | 7/1995 | Irsch . | |
| 5,441,742 | 8/1995 | Autant et al. . | |

FOREIGN PATENT DOCUMENTS

| | | | |
|---|---|---|---|
| 449758 | 7/1948 | Canada | 239/654 |
| 472855 | 10/1937 | United Kingdom | 239/654 |

*Primary Examiner*—Lesley D. Morris
*Attorney, Agent, or Firm*—Chrisman, Bynum & Johnson

[57] ABSTRACT

A method and apparatus for applying agriculture seed/fertilizer mix and the like to the ground. A receptacle having an agitator and rotating blades are affixed to a housing containing a blowing motor. Agriculture seed/fertilizer mix is poured into the receptacle and blown out through a hose attached to an outlet port on the housing. A nozzle is attached to the end of the hose for effective and uniform application of the materials. A pressurized liquid supply is attached to the nozzle in order to moisten the material as it passes through the nozzle and out over the ground.

9 Claims, 2 Drawing Sheets

METHOD AND APPARATUS FOR APPLYING AGRICULTURAL SEED OR FERTILIZER MIX OVER THE SURFACE OF THE GROUND

This application is a continuation-in-part of application Ser. No. 08/547,955 filed on Oct. 25, 1995 now abandoned.

FIELD OF THE INVENTION

The field of the invention relates generally to lawn care and landscaping, and more specifically to a method of preparing and spreading agriculture seed/fertilizer mix and the like over the surface of the ground.

BACKGROUND OF THE INVENTION

Ground preparation, lawn care and landscaping are fairly common activities, being essential to the upkeep and maintenance of home lawns, parks, stadiums, highways, berms and farms. Although there are some prior art devices designed to assist in lawn care, such as mowers, there are relatively few devices designed to augment the application of fertilizer mixes, agriculture seed and related compositions. Moreover, the devices available are cumbersome and time consuming to use. As evidenced by the lawn care aids presently available, it can be seen that in general, lawn care is still a labor intensive activity.

There are few machines designed to aid in the laying a cover of agriculture seed or fertilizer mix over the surface of a lawn, such as the broadcast type spreader. One such fertilizer or seed spreader is comprised generally of a bucket or basin to place the fertilizer in, the basin being mounted on a pair of wheels and having a number of small openings at the bottom. A number of blades rotate about an axis running across the lower end of the basin, forcing the fertilizer or seed out of the openings in the bottom of the basin. A handle extends upwardly from the basin so that the operator can grasp the handle and push the device to make it operate. The operator of the device then walks back and forth over the entire surface to be covered in order to apply the fertilizer. On a larger scale, the device may be operated by mounting it to the back of a vehicle, and pulling it over the surface of the ground.

Other fertilizer compositions are not suited for use with the pushcart device previously described, in particular ground cellulose materials, and thus need to be applied manually. In the manual application of the fertilizer, one must take handfuls of seed, fertilizer or mix and sprinkle it over patches of the yard or over perhaps the entire lawn.

The devices and methods available in the prior art are cumbersome and time consuming to use. The limitations of the devices are even more apparent in industrial applications such as stadium fields, parks and highways where there is a greater surface area to be covered.

The applicant is aware of certain devices designed primarily for spreading insulation into the walls or attic of a structure. For example, U.S. Pat. No. 4,560,307 of Deitesfeld discloses an apparatus for blowing insulation comprised of an upright hopper over an agitator having rotating blades for directing the insulation through the apparatus and outward through a blower hose attached to the device. Such an apparatus has been successful in effectively spreading insulation because of its portability and blowing power. Thus far, however, this technology has not been utilized for any other purposes other than its intended purpose for spreading insulation.

As seen by the prior art, devices have been developed that aid in the spreading of seed or fertilizer over the surface of a lawn. However, it can be seen that none of these devices completely solve the problem of providing an easy, fast and efficient way for the operator to spread fertilizer or seed evenly over the ground. The operator typically has to walk back and forth over the area being attended to, spreading the fertilizer or seed over the surface of the ground. The materials are often applied in a non-uniform manner, wherein application of the materials in some areas may be thicker than others. Further, the operator needs then to undertake a second time consuming step of watering the ground once the material has been applied. The watering step is intended not only to effect growth, but to help secure the materials to the ground. On a windy day, it is readily apparent that a delay between applying seed or fertilizer and moistening the fertilized ground could result in the agriculture seed/fertilizer mix being blown away from the place where it has been applied.

A desired apparatus and method for spreading fertilizer should include a portable, powerful device which is efficient and easy to use. Preferably, the device and method should include the ability to combine the fertilizer, seed and moisture as the material is being applied to the ground. The device should be adapted for precise application of the agriculture seed/fertilizer mix, while being relatively easy to use.

SUMMARY OF THE INVENTION

The present invention provides an apparatus and method for applying agriculture seed/fertilizer mixtures or a combination thereof on the surface of the ground. The apparatus consists generally of a receptacle to receive agriculture product, seed or fertilizer mix material, an agitator, a blower motor, and a blowing hose or passageway having one end attached to an outlet on the housing of the machine. Optionally, the opposite end of the blowing hose or passageway may be attached to a nozzle which is lightweight and durable, which provides highly accurate patterning of the agriculture seed/fertilizer mix. A liquid supply line is attached to the nozzle to allow the agriculture seed/fertilizer mix to be wetted before and as it is applied to the ground.

In operation, the agriculture seed/fertilizer mix is placed into the receptacle, and the apparatus connected to a power supply. One end of the blower hose is attached to the outlet port of the machine while the other end of the hose is attached to the nozzle. Next, the agitator and the blower are turned on. With the aid of the agitator, the agriculture seed/fertilizer mix flows from the receptacle, into an airlock chamber and is propelled out through the blower hose. An adjusting slidegate allows the operator to regulate the material flow through the apparatus.

A nozzle at the end of the blowing hose may be used to direct the application of materials to the ground. A pressurized liquid source may be attached to the nozzle to provide a dispersed stream of water which moistens the material as it flows from the blower hose and out through the nozzle. Utilizing this method, the material is uniformly spread at a thickness of between (but not limited to) ½ and ¼ inches, and is moist as applied to the ground.

DETAILED DESCRIPTION OF THE PREFERRED EMBODIMENT

Figure 1:
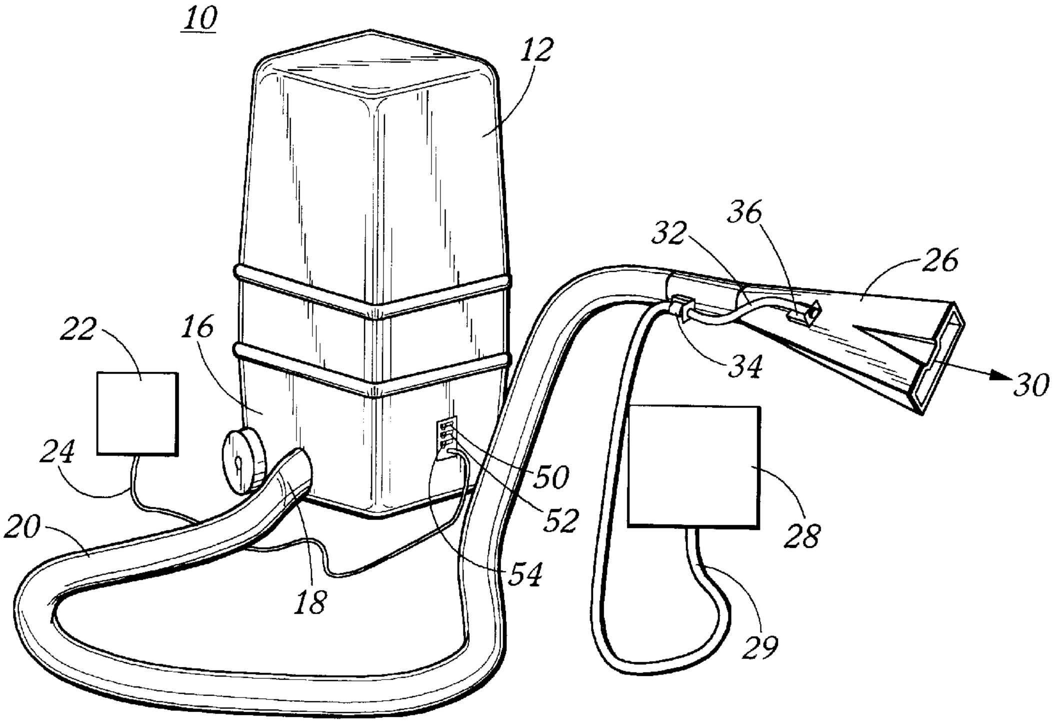
FIG. 1 illustrates one embodiment of the device used in accordance with the method of the present invention.

With reference to FIG. 1, it can be seen that in one embodiment, the device 10 used in accordance with this invention consists of a receptacle 12 having an a agitator and airlock chamber, and a blower motor contained within housing 16. A blower hose 20 is attached to outlet port 18, and a precision nozzle 26 may be attached to the other end of blower hose 20. The device 10 may be connected to an external power supply 22 by cord 24, or optionally to a generator (not shown). On the housing control panel are located the power switch 50, blower switch 52 and agitator switch 54. An external liquid supply 28 may be connected to nozzle 26 to allow for moistening of the agriculture seed/fertilizer mix as it is being applied to the ground.

In a preferred embodiment, the receptacle 12 is designed to hold up to 25 lbs of agriculture seed/fertilizer mix or mulch materials, but not limited to holding the 25 lbs. of material. Industrial applications may include a receptacle which holds several times that amount.

An example of a fertilizer mix used in accordance with the present invention is one which includes ground cellulose, time release agriculture seed/fertilizer mix and colorant. Such a mix is commercially available from O.M. Scotts & Sons, Inc. under the trademarked brand name, PATCHMASTER lawn repair mix. It is understood that various other seeds and fertilizers having varying compositions may be used in accordance with the present invention and the foregoing example is intended to be exemplary rather than limiting. The method of the invention is suited for application of any ground cellulose compositions, which may or may not contain fertilizer. In some applications, such as ground fill, the use of fertilizer mix or agriculture seed is not always desirable.

With reference still to FIG. 1, the agriculture seed/fertilizer mix is poured loosely into the receptacle 12 in the direction of arrow 14. At the bottom of the receptacle 12 is an agitator with blades (not shown). The agitator comprises a series of blades extending radially from a hub on the upper end of an upright shaft which is coupled to an airlock rotor shaft by a chain and sprocket connection. The blades of the agitator rotate opposite to the direction of rotation of the airlock blades beneath the airlock inlet, so that the fertilizer materials pushed through the opening by the agitator blades will be pushed into successive spaces between adjacent pairs of airlock sections as they start downwardly turning. In addition, a slide gate may extend through a slot in the lower end of a side wall of the receptacle to regulate the amount of agriculture seed/fertilizer mix material moving from the receptacle through the opening and into the airlock.

The outlet 18 of the airlock opposite of the inlet extends from the outer end plate of the airlock through an annular wall of the housing 16, while the airlock inlet and the blower connection are laterally offset from the vertical center of the airlock shaft. As seen in FIG. 1, housing 16 is essentially a downward extension of the receptacle 12 and readily contains the necessary operating parts herein described.

Figure 2:
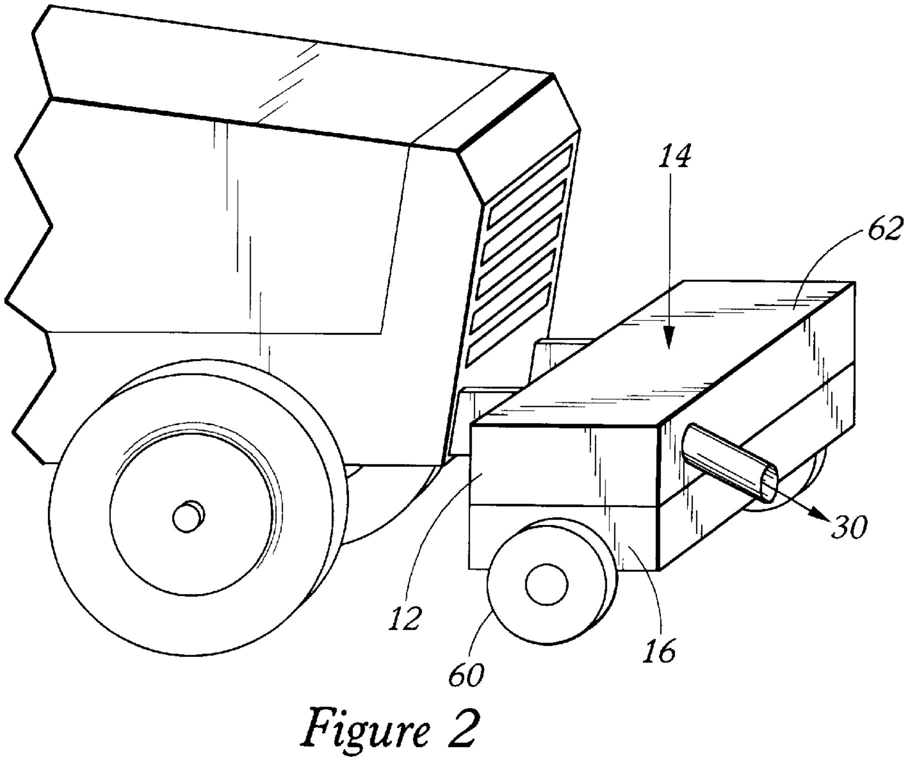
FIG. 2 shows a perspective view of an alternative embodiment of the device used in accordance with the method of the present invention.
Figure 4:
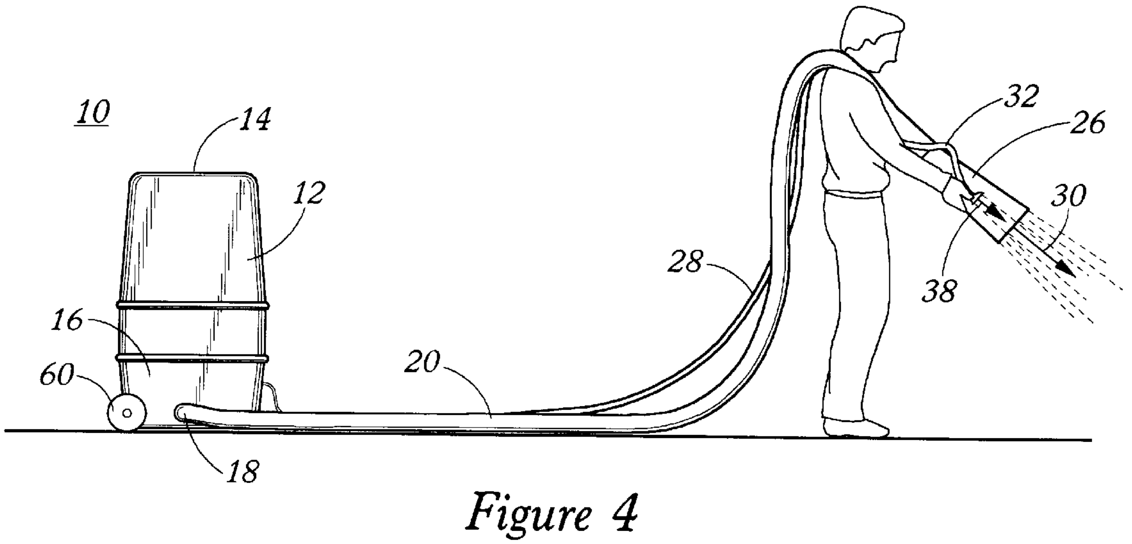
FIG. 4 illustrates use of the device of FIG. 1 in accordance with the present invention.

As seen with reference to FIGS. 2 and 4, in various embodiments, the housing 16 and receptacle 12 are mounted in combination on an axle on the lower periphery of the housing 16, the axle having a six inch wheel 60 on either end (seen with reference to both FIGS. 2 and 4). This allows the entire device to be readily tilted and then rolled to a position on the ground desirable to operate from, or pulled in operation from the back of a truck. As is readily understood, the ability to tilt and push, or pull the apparatus 10 greatly adds to its portability and ease of use.

In the embodiment illustrated in FIG. 1, the agitator and airlock system utilizes a three-quarter 8.4 amp drive motor coupled to the power transmission. The airlock itself has a 6½x7¼ opening and steel 6-vane cast urethane seals. It has been found that to provide maximum single blower pressure and output, the device preferably is equipped with a 966 watt, two-stage blower motor. The blower motor is connected to the air intake port of the airlock by a metal sleeve. Preferably, the device is powered to a 20 amp power supply source, although a 4000 watt generator with a 50% power boost will be adequate for start up.

Still with reference to FIG. 1, it can be seen that connected to outlet 18 is a blower hose 20. In a preferred embodiment, blower hose 20 is formed of a clear plastic material. The blower hose 20 is clear in order to readily detect the nature or position of any possible clog or obstruction of the hose. The blower hose 20 has a diameter which provides adequate throughput to efficiently cover the ground. Any desired length of blowing hose 20 is adequate for use with the present invention although it has been found that a hose measuring 100 feet gives a great degree of mobility about the device 10.

FIG. 2 shows an alternative embodiment of the device of the present invention. It is understood that the device consists of the same general components within housing 16, although the device may take different forms which are suited for industrial applications. For example, receptacle 12 may vary in shape and size. Blower hose 20 may take the shape of passageway 62. The size and power of the blower motor and agitators can be adapted for use in machines suited for both at home use and for industrial use. The device may be operated by hand, as understood with reference to FIGS. 1 and 4, or may be connected to or integrally a part of a vehicle or farm machinery as shown in FIG. 2. These non-limiting examples and adaptations thereto are considered to be within the scope of the present invention.

Figure 3A:
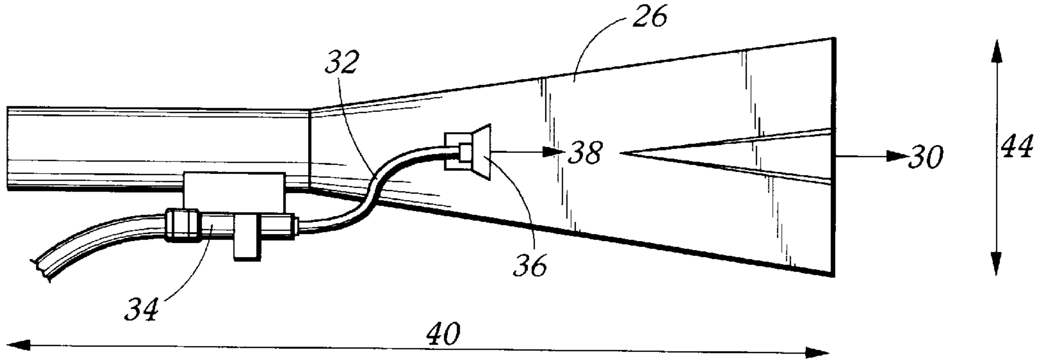
FIG. 3A shows a side, perspective view of one embodiment of the nozzle which may be used in accordance with the present invention.
Figure 3B:
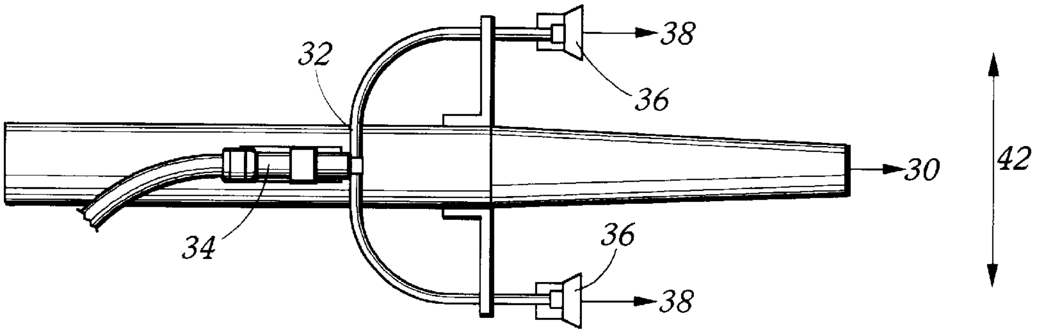
FIG. 3B shows a top view of the one embodiment of the nozzle which may be used in accordance with the present invention.

FIGS. 3A and 3B show one embodiment of a nozzle used in accordance with the present invention. As seen in these figures, extending from the liquid supply source on either side of the nozzle 26 are a pair of spray jets 36, which spray the liquid planar to and in the same direction as the open end of the nozzle 26. Spray jets 36 are connected to the liquid supply by hose 32. As seen with reference to FIG. 3B, the materials pass from the nozzle in the direction of arrow 30, while the path of liquid flow is indicated by arrow 38. Optionally, the liquid flow may be directed into the nozzle 26 and the materials wetted by a dispersed stream of water as they pass through the inside of the nozzle 26.

In other embodiments of the present invention, nozzle 26 may be replaced by any apparatus suited for connection with a pressurized liquid supply, and capable of dispelling a disperse stream of water into the materials as they are applied to the ground. It is further understood that in some applications, when it is desirable to apply materials dry rather than wetted, the nozzle 26 may not be used at all.

In use, the device and method of the present invention works primarily as follows. The operator loosely pours the agriculture seed/fertilizer mix or the like into the receptacle 12. The blower hose is connected at one end to an outlet port 18 of the housing 16 and at the other end to nozzle 26. A pressurized liquid supply 28 is also attached to the nozzle 26. The device is connected to power supply 22, and turned on. As the agitator begins to spin at the bottom of the receptacle 12, the material is dropped into an airlock chamber and propelled outwardly through outlet port 18 into blower hose 20. Next, the material passes from the blower hose 20 through nozzle 26. As the material passes through nozzle 26, if pressurized liquid supply 28 is turned on, the material is moistened by a dispersed stream of water as it passes out from the nozzle 26. The moist material is then blown outward over the ground.

The potential uses for the method of the present invention are many. For example, the materials used in accordance with the present invention include, but are not limited to, fertilizers, fertilizer mixes, mulch, lawn seeds, flower seeds, or agriculture seeds. The apparatus and method can be used in park and highway maintenance, stadium fields, gardens, sod farms, home lawns, erosion control, parade floats and/or any other decorative uses.

A mix well suited to the method of this invention includes a fracturable material and a carrier. A suitable fracturable material may be selected from the group consisting of fertilizer, fertilizer mix, mulch, lawn seed, flower seed or agriculture seed. A suitable carrier such as, for example, cellulose is of greater density than the fracturable material. A suitable mixture of fracturable material and carrier is one which has more carrier (by weight) than fracturable material.

An apparatus well adapted for use in the method of this invention is the blower described in U.S. Pat. No. 4,560,307 of Deitesfeld, commonly owned by the applicant of the instant application. U.S. Pat. No. 4,560,307 is hereby incorporated herein by reference. Such a blower includes:

(a) a generally cylindrical, upright hopper;

(b) a partition providing a generally circular bottom for said hopper, said partition having an opening through which insulation may move from said hopper;

(c) an agitator movable about an upright axis in said hopper, including an upright shaft extending upwardly through said partition;

(d) an enclosure formed by a wall beneath said partition and formed essentially as an extension of said hopper, said agitator shaft extending into said enclosure;

(e) an airlock beneath said partition and within said enclosure, said airlock having a housing provided with an upper inlet located to receive a material and carrier substance mixture moving through said partition opening and having a central, generally horizontal shaft carrying a series of radial vanes within said housing, an air inlet and an outlet extending through said enclosure wall at a position laterally offset from a vertical plane through the center of said airlock shaft for discharge of insulation propelled by such air, said inlet and corresponding outlet being at opposed ends of the lower portion of said airlock housing and the axis of said horizontal airlock shaft extending to generally intersect the axis of said agitator shaft;

(f) a drive for rotating the agitator shaft and the airlock shaft; and (g) a blower having an air discharge connection communicating with said air inlet of the airlock, said air inlet and said blower connection being laterally offset from said vertical plane through the center of said airlock shaft to clear said agitator shaft.

These and other details of such a blower are fully described in the referenced patent. It should now be readily understood that such a blower is well suited to the method of the instant invention because, in contrast to the prior art of which the applicant is aware, the method of the present invention is designed to avoid having a fracturable material come into contact with the rotating fans of the blowing motor or similar moving plane or moving device. The seed material for which the instant method is intended is fracturable, and will fracture if pulled into the fan. Thus, the blower suitable to the method of the instant invention uses an airlock system to pull a portion of the material from the receptacle into the airlock, thereby isolating that portion of the material inside the airlock chamber from the agitator shaft while at the same time isolating the material in the receptacle from the blower.

Accordingly, the method of this invention permits a fracturable material (seed) to be mixed with a heavy carrier (cellulose); poured into a receptacle; drawn into an airlock; isolated within the airlock from the agitator shaft in the receptacle, while isolating the material still in the receptacle from the fan blades in the blower motor; blown out of the airlock; and directed to the ground—all with sufficient power to propel the carrier, and with sufficient protection to help maintain the integrity of the seed or other fracturable material.

What is claimed is:

1. A method for applying a wetted material over a surface of the ground comprising:

(a) loosely pouring a dry material into a blower, said blower comprising a generally cylindrical, upright hopper;

a partition providing a generally circular bottom for said hopper, said partition having an opening through which the material may move from said hopper;

an agitator movable about an upright axis in said hopper, including an upright shaft extending upwardly through said partition;

an enclosure formed by a wall beneath said partition and formed essentially as an extension of said hopper, said agitator shaft extending into said enclosure;

an airlock beneath said partition and within said enclosure, said airlock having a housing provided with an upper inlet located to receive a material and carrier substance mixture moving through said partition opening and having a central, generally horizontal shaft carrying a series of radial vanes within said housing, an air inlet and an outlet extending through said enclosure wall at a position laterally offset from a vertical plane through the center of said airlock shaft for discharge of the material propelled by such air, said inlet and corresponding outlet being at opposed ends of the lower portion of said airlock housing and the axis of said horizontal airlock shaft extending to generally intersect the axis of said agitator shaft;

a drive for rotating the agitator shaft and the airlock shaft; and a blower having an air discharge connection communicating with said air inlet of the airlock, said air inlet and said blower connection being laterally offset from said vertical plane through the center of said airlock shaft to clear said agitator shaft;

said outlet being connected at a first end to said housing and vented to the atmosphere at a second end;

(b) drawing a portion of said material into said airlock thereby isolating said portion of the material inside the airlock from the agitator shaft while isolating the material in the receptacle from the blower (c) blowing said portion of the material out of the airlock and into said outlet;

(d) directing said material outwardly from said outlet in a material flow path into the atmosphere; and (e) dispersing a stream of liquid from a location behind the outlet in a liquid flow path into said materials outside of the outlet and as said materials are suspended in said atmosphere, said liquid flow path being generally parallel to the material flow path.

2. The method of claim 1, further comprising the step of selectively controlling the flow of material through said housing.

3. The method of claim 2, wherein said material is fertilizer mix.

4. The method of claim 2, wherein said material is agriculture seed.

5. The method of claim 2, wherein a nozzle is attached to the second end of said outlet, said nozzle for directing the flow of said material to the ground.

6. A method for applying a wetted material over a surface of the ground comprising:

(a) loosely pouring a dry material into a receptacle of a blower, said blower having an agitator shaft, an airlock, and an outlet;

(b) drawing a portion of said material into said airlock thereby isolating said portion of the material inside the airlock from the agitator shaft;

(c) blowing said portion of the material out of the airlock and into said outlet;

(d) directing said material outwardly from said outlet in a material flow path into the atmosphere; and (e) disposing a first spray jet behind the outlet and dispersing a stream of liquid through the first spray jet in a first liquid flow path into said materials outside of the outlet and as said materials are suspended in said atmosphere, said first liquid flow path being generally parallel to the material flow path.

7. The method of claim 6, further comprising the step of:

disposing a second spray jet behind the outlet and dispersing a stream of liquid through the second spray jet in a second liquid flow path into said materials outside of the outlet and as said materials are suspended in said atmosphere, said second liquid flow path being generally parallel to the material flow path; the first and second liquid flow paths being disposed on opposite sides of the material flow path.

8. The method of claim 1, wherein said material is a mixture of a fracturable material and a carrier; the fracturable material selected from the group consisting of fertilizer, fertilizer mix, mulch, lawn seed, flower seed or agriculture seed; the carrier is of greater density than said fracturable material; and the mixture of fracturable material and carrier has more carrier (by weight) than fracturable material.

9. The method of claim 6, wherein said material is a mixture of a fracturable material and a carrier; the fracturable material selected from the group consisting of fertilizer, fertilizer mix, mulch, lawn seed, flower seed or agriculture seed; the carrier is of greater density than said fracturable material; and the mixture of fracturable material and carrier has more carrier (by weight) than fracturable material.

* * * * *